July 13, 1943.　　　　　S. CRUM　　　　　2,324,136
COMBINATION SWITCH
Filed Feb. 19, 1941　　　　2 Sheets-Sheet 1
Fig. 1
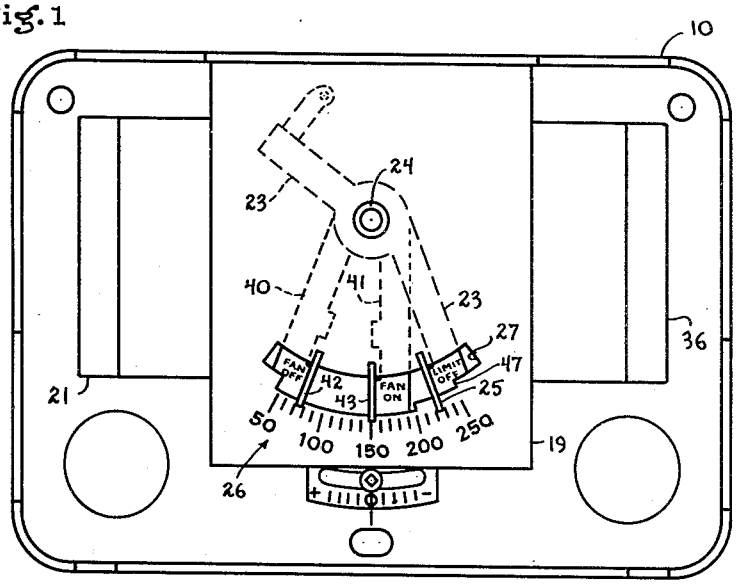
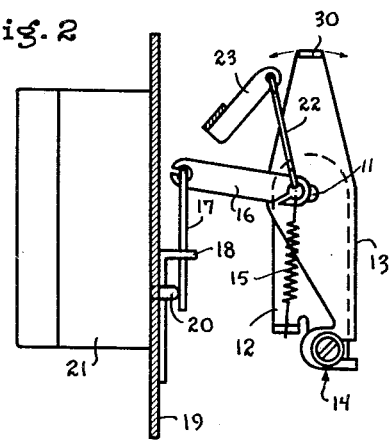
Fig. 2
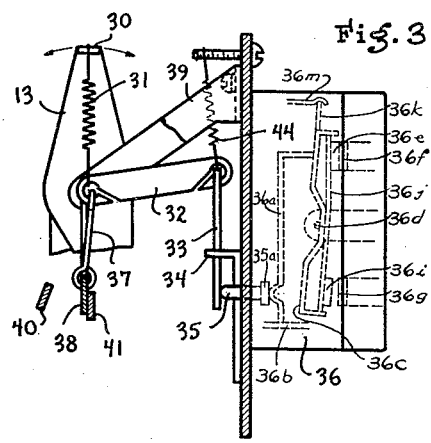
Fig. 3
INVENTOR
Stephen Crum
BY George H. Fisher
ATTORNEY July 13, 1943.　　　　　S. CRUM　　　　　2,324,136
COMBINATION SWITCH
Filed Feb. 19, 1941　　　　2 Sheets-Sheet 2
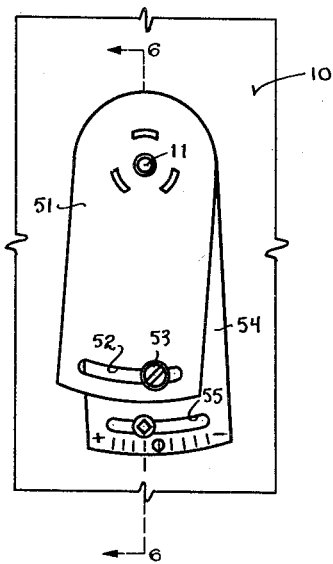
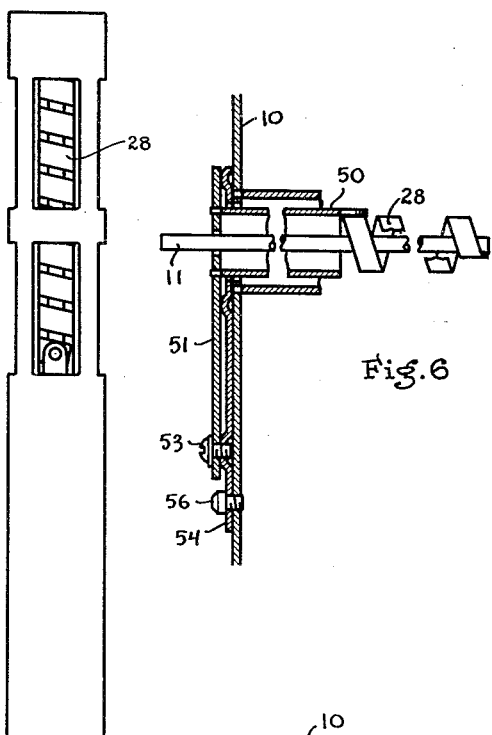
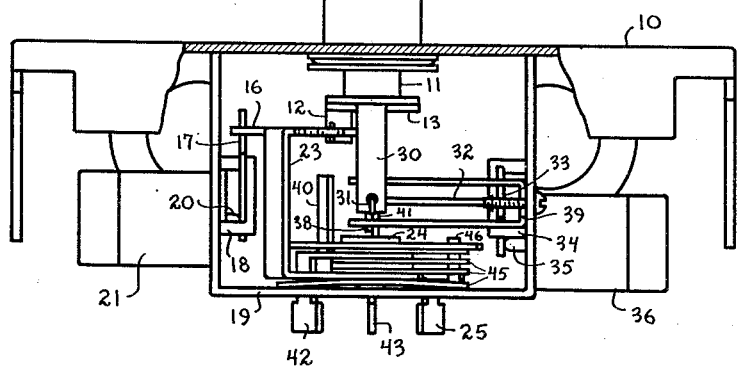
INVENTOR
Stephen Crum
BY George H. Fisher
ATTORNEY Patented July 13, 1943

2,324,136

UNITED STATES PATENT OFFICE 2,324,136

COMBINATION SWITCH

Stephen Crum, Minneapolis, Minn., assignor to Minneapolis-Honeywell Regulator Company, Minneapolis, Minn., a corporation of Delaware Application February 19, 1941, Serial No. 379,563

21 Claims. (Cl. 200—139)

This invention relates to automatic switching mechanisms, and one of its objects is to improve that type of mechanism wherein a plurality of switches are sequentially operated by a single condition-responsive element; such as, for example, a combination fan and high limit control actuated by a temperature responsive device.

Another object of this invention is to provide improved means for adjusting separately the switch closing and switch opening temperatures for the fan controlling switch, and the switch opening temperature of the limit switch, while maintaining a fixed differential between opening and closing temperatures of the limit switch.

A further object of this invention is to provide a linkage between a condition-responsive element and a switch including an improved strain release connection. whereby overrun of the condition-responsive element will not cause undue strain of either element or switch.

A further object of this invention is to provide an instrument, including a strain release connection and an adjusting means, wherein the adjusting means is mounted on a fixed part of the instrument, so that no torque is placed on the sensitive element during a change of adjustment. It is also an object of the invention to provide such a device using a snap-action switch.

A further object of the present invention is to construct a combined fan and limit switch which may be operated by a thermostatic element placed in the bonnet of a warm air heater in accordance with the temperature of the air delivered from the heater. It is also an object of the invention to provide in such a device means for compensating the thermostatic element for differences between the conditions at the point at mounting and conditions at the point of delivery of air from the furnace.

It has been proposed to use such a mechanism as that herein disclosed to control a hot air heating system wherein a fan is used to force the circulation of heated air through the house. In such a case the actuating thermostat for the two switches is placed in the bonnet of the furnace and the high limit switch is wired in series with the main controlling thermostat (usually in one of the rooms) so as to shut down the heating system in case the temperature of the air in the furnace bonnet becomes excessive. The fan switch controls the operation of the fan and is usually set to keep the fan deenergized when the air in the bonnet is cool. As soon as the air becomes warm enough to heat the house, the fan switch closes to start the fan in operation. This normally results in a drop in temperature of the bonnet air with a consequent opening of the fan switch. It is desirable, however, in order to prevent an excessive amount of "hunting" with a consequently excessive number of switch operations, to provide an appreciable differential between the temperature at which the fan starts to operate, and the temperature at which its energizing circuit is opened.

It has been found desirable, in order to provide a device which is readily adaptable to suit the requirements of different heating systems, to make the fan switch closing and opening temperatures readily adjustable. It is also desirable to provide means for adjusting the limit switch opening temperature, but it is not usually necessary to provide means for adjusting the temperature differential between opening and closing of the limit switch. The operating differential of the limit switch may be set at the factory at an optimum value. In the present invention, therefore, means for adjusting the temperature differential of the limit switch, such as have been provided in some devices of the prior art, are dispensed with, thus simplifying the structure.

Since, in a device of this sort, the operating force supplied by the condition-responsive element is small, it is essential that the switches used be operated with a minimum amount of force.

Devices of the type described are intended to be actuated in accordance with the temperature of the air at the point of delivery from the furnace. These devices are not normally mounted at the point of delivery, however, and it has been found that the conditions affecting the thermostatic element at the point of mounting are sometimes quite different from the condition at the point of delivery. In any given type of furnace, it has been found that the conditions at the point of mounting bear a definite and substantially constant relationship to the conditions at the point of delivery. Since the applicant's device is intended to be used with many different types of furnaces, means have been provided for adjusting the calibration of the thermostatic element to compensate for differences in this relationship in different types of furnaces.

These and other objects will readily become apparent as the following description is read in the light of the accompanying drawings, in which:

Figure 1 illustrates a front view, with the cover and certain parts removed, of a combination fan and limit switch embodying my invention, Figure 2 illustrates the operating mechanism of the limit switch in the device of Figure 1, Figure 3 illustrates the operating mechanism of the fan switch in the device of Figure 1, Figure 4 is a plan view of the device of Figure 1, showing the parts in their assembled relation, Figure 5 is a front view of the calibration and radiation compensating adjustments of my device, and Figure 6 is a section taken on the line 6—6 of Figure 5.

In the drawing is shown a casing 10 which is adapted to be mounted on the bonnet of a furnace. A shaft 11 extends through the back of the casing 10 and is adapted to be rotated by a thermostatic element 28 which projects from the back of the casing 10 into the interior of the bonnet. Rotation of the shaft 11 by the thermostatic element turns an arm 12 which is attached to the shaft 11 in any suitable manner. Mounted freely on the shaft 11 is a second arm 13 which is adjustable relative to the arm 12 by means of a pin and slot arrangement as shown at 14. A spring 15 is attached to the outer end of the arm 12 and extends back along the arm to a point substantially over the end of the shaft 11 where it engages one end of a rigid link 16. The other end of the link 16 is connected to one end of a second rigid link 17 which is pivotally mounted in a bracket 18 attached to one side of a cover member 19 which is suitably mounted on the casing 10. The opposite end of the pivoted link 17 operates a switch actuating member 20 which extends through a hole in the cover member 19 and actuates a switch 21 attached to the outside of said cover member.

This switch is preferably a snap switch of the self return type such as that disclosed in the application of Albert E. Baak No. 307,991 filed December 7, 1939.

Another rigid link 22 connects the central end of link 16 with an adjusting member 23. The member 23 turns on a hub 24 mounted on the inside surface of the cover 19 so as to be in line with the shaft 11. The member 23 has two arms one of which extends rearwardly from the cover member 19 and engages the link 22. The other arm of adjusting member 23 extends radially from the hub 24 and has at its outer end an indicator 25 which projects through a slot 27 in the cover 19 and cooperates with a scale generally indicated at 26 on the outer surface thereof.

The arm 13 is provided with an extension 30 at the end opposite the pin and slot arrangement 14. This extension projects forwardly of the arm 13 and carries at its forward end one end of a spring 31. The other end of the spring 31 is attached to a rigid link 32 at a point substantially over the end of the shaft 11. The other end of the link 32 is connected to a link 33 pivotally attached to a bracket 34 mounted on the opposite side of the cover 19 from the bracket 18. The pivoted link 33 operates a switch actuating member 35 which extends through the side of the cover member 19 and actuates a switch 36 preferably of the same type as switch 21. The structure of the switch 36 is best shown in Figure 3. The switch 36 has an enlarged portion 35a on the plunger 35 which cooperates with a raised portion of an actuating arm 36a. The arm 36a is of resilient material and is pivoted at 36b. A contact carrying rocker member 36c is pivoted on the central terminal post at 36d and is rocked thereabout by the arm 36a. Contacts 36e and 36i are carried upon a resilient contact blade 36j which is suitably secured to the rocking member 36c. The contacts 36e and 36i cooperate respectively with contacts 36f and 36g mounted on the base of switch 36. A toggle member 36k abuts the upper end of the rocker member 36c and is biased into engagement therewith by a biasing spring 36m. The angle between the points of contact of the member 36k with the spring 36m and the rocker member 36c does not pass over center with respect to the pivot point 36d. With such structure, a spring rate compensation snap action is obtained.

The operation of the switch 36 is as follows: when the button 35 is moved to the right, tension is stored in the resilient member 36a. This tension is resisted by the spring 36m which acts upon the toggle member 36k. This toggle member engages the rocker member 36c at an angle. This angle and the tension in the spring 36m are so selected that they will resist the tension in the resilient member 36a to a predetermined extent. However, when the tension of member 36a overcomes the tension of spring 36m the member 36a begins to move toward the left this resisting force will decrease at a rate more rapid than the decrease of force exerted by the member 36a. Because of this change in force relationship, the contacts will be snap actuated with what is termed a spring rate compensation snap action. In this type of action the tendency of the contacts to move together increases as they approach each other. This function could also be obtained by a magnetic snap action of the self return type in which the contacts are attracted together with a greater magnetic force as the contacts are brought more closely together. It is to be understood that other types of switches having a similar characteristic could also be substituted for the switch 36 without interfering with the operation of the present control device. The central end of the link 32 also engages another rigid link 37 which extends substantially radially from the axis of rotation of the shaft 11 and is attached at its outer end to a bail 38. The ends of the bail 38 are pivotally received in a U-shaped bracket member 39 which is mounted on the cover 19 and extends over the end of the shaft 11 so that the pivots of the bail 38 are substantially in line with that shaft. A pair of stop members 40 and 41 are provided for limiting movement of the bail 38. These stop members are rotatably mounted on the hub 24 and are provided at their outer ends with indicators 42 and 43 which extend through the slot 27 in the cover member 19.

A spring 44 is attached at one end to the junction of links 32 and 33 and at the other end to a bolt or other suitable device inserted inside of the cover member 19.

Flat spring members are provided, as shown at 45, which hold the adjustable members 23, 40 and 41 in frictional engagement with the hub 24. A post 46, which engages a notch in each of the flat springs 45, prevents rotation of the springs.

One end of the thermostatic element 28 is attached to the shaft 11. The other end is attached to a collar member 50, which extends through the casing 10 in concentric relation with the shaft 11, and is attached at its inner end to a calibration adjustment plate 51. Plate 51 is slotted at 52 to receive an adjusting screw 53 which is threadedly attached to a secondary adjustment plate 54. Plate 54 is in turn slotted at 55 to receive an adjusting screw 56 which is threadedly attached to the casing 10. Plate 54 pivots freely about the collar member 50. Plate 54 is provided with a scale adjacent the slot 55 having a zero mark at its center. The smaller divisions of the scale represent fixed increments of temperature, for example 10°. Screw 56 is preferably provided, for reasons to be set forth later, with a head having an internal socket of peculiar shape, so that it may be loosened only by a special wrench.

*Operation*

The switch 21 is the limit switch of the combination fan and limit control. The shaft 11 turns in a counterclockwise direction as the temperature in the bonnet of the furnace increases. The parts are shown in Figure 2 in the position they have when the actuating member 20 has been permitted to move outwardly so that the limit switch is closed and the furnace is in normal operation. When the bonnet temperature increases from this condition, turning the shaft 11 in a counter-clockwise direction, the lower end of arm 12 is moved to the right carrying with it the end of the spring 15. After the spring passes the point where it is in line with the link 22 its further movement transmits a force to the link 16 tending to translate it to the right. This force is opposed, through the link 17, by the spring in the switch 21 which tends to hold the switch actuating member 20 in an outward position from the switch. As this opposing force is small, it will be readily overcome, and the member 16 will move to the right and the member 17, pivoting about the bracket 18 will push the switch actuating member 20 to the left, thus opening the limit switch.

If it is desired to change the temperature at which the limit switch is actuated, the adjusting member 23 may be manually adjusted by moving its indicator 25 along the scale 26 and thereby moving the upper end of the link 22 around the axis of the shaft 11. This will change the temperature at which the spring 15 is moved into line with the link 22 and will therefore change the temperature at which the limit switch is opened.

After the limit switch has opened, causing a reduction in the heating effect of the furnace, the bonnet temperature will drop and the shaft 11 will turn clockwise moving the arm 12 to the left. As soon as it has moved a short distance, sufficient to move the spring 15 back over the center position where it is in line with the link 22, the switch 21 will push the switch actuating member 20 outwardly, since there will be no force exerted by the spring 15 to oppose the motion of the link 16 to the left. It will be understood that the exact temperature differential between the opening and the closing of the limit switch is determined by the torque and motion characteristics of the thermostatic element, the linkage, and the limit switch itself.

The switch 36 is the fan switch of the combination fan and limit control. In the position of the parts shown in Figure 3, the temperature of the furnace bonnet is low and the switch 36 is open. As the temperature of the furnace increases the upper end of the arm 13 will be moved to the left carrying with it the outer end of the spring 31. As soon as the projection 30 on the arm 13 has moved far enough to the left to move the spring 31 beyond the line of centers of the ball 38 and the junction of links 32 and 37, the spring 31 will exert a force on the link 32 tending to move it to the left. Upon further movement in the same direction, this force will become great enough to operate the switch 36. The link 32 will then move suddenly a short distance to the left and the spring 31 will snap the ball 38 against the stop 40. The link 33 will simultaneously be suddenly pivoted about the bracket 34 and will push the switch actuating member 35 in so as to close the circuit of the fan.

The fan will continue to operate until the bonnet temperature starts to drop. As the bonnet temperature drops the projection 30 on arm 13 will be moved to the right. After the spring 31 moves beyond the line of centers of the ball 38, which is now against the limit 40 it will exert a force on the link 32 which will gradually become large enough to actuate the switch. The link 32 will then move to the right pivoting the link 33 about its bracket 34, thereby allowing the switch actuating member to be pushed outwardly by the internal spring in the switch 36. The ball 38 will be snapped back against stop 41 at the same time.

The spring 44 is provided to balance the internal spring 36m in the switch 36 so that a force is required to actuate the switch in either direction.

The same effect could be obtained by designing the switch 36 so that it had to be forcibly actuated in both directions, and using a two-way driving connection between link 33 and switch actuating member 35. For convenience in assembling the combination switch, however, it is better to use duplicate switches on both sides of the device and take care of the balancing of the internal spring by using the spring 44 as described.

If it is desired to change either the temperature at which the fan is turned on or the temperature at which it is turned off, the limits 40 and 41 may be moved by adjusting the indicators 42 and 43 along the scale 26. Such an adjustment would change the position of the arm 13 at which the snap action mechanism becomes effective to actuate the switch.

It will be seen that this mechanism is effective, each time the fan switch is operated, to reset the temperature at which the return operation takes place to a predetermined value.

It should be noted that all the manual adjusting means 25, 42, and 43 may be moved without placing any additional torque on the thermostatic element. This permits the use of a lighter thermostatic element with higher sensitivity than that obtained with previous devices.

Considering only the fan switch of my invention, as shown in Figure 3 of the drawings, it will be seen that the only force opposing rotation of the shaft 11 is that due to the tension of spring 31. Furthermore, the range of motion of the lower end of spring 31, relative to the axis of shaft 11, is very small.

The tension of spring 31 may, for convenience, be considered as the resultant of two components, one acting longitudinally of the arm 13, and the other transversely. The longitudinal component is taken up at the bearing where the shaft 11 passes through the casing 10, and does not affect rotation of the shaft, except as it affects friction at the bearing. Furthermore, in the embodiment of my invention herein disclosed, the springs 15 and 31 are mounted so that the longitudinal components of their tensions oppose each other, thereby balancing the load on the bearing of the element shaft. Lower bearing friction, a lower inherent operating differential, and higher efficiency result from this construction.

The transverse component of the tension of spring 31 depends upon the position of the arm 13 and the condition of the switch 36. Since the switch linkage is such that a force is required to move the switch from one of its positions to the other, this transverse component is always directed so that it opposes actuation of the switch. For example, when the parts are in the position shown in Figure 3, the force acting on the link 32, due to the switch springs, is directed to the right, so as to oppose any force tending to push the member 35 in and actuate the switch. This force is substantially equal in magnitude to the transverse component of tension of spring 31. The tendency of this force is, therefore, to move the extension 30 of arm 13 to the right, or, in other words, to oppose its motion to the left. If, due to the action of the thermostatic element, the extension 30 is moved to the left and the switch is actuated, the force due to the switch springs on the link 32 is reversed in direction, and then tends to move extension 30 to the left.

It may be seen, therefore, that the mechanism acts as a strain release, in that, after actuation of the switch, only the small force needed to maintain the switch in the actuated position opposes further rotation of the thermostatic element in the same direction which caused the switch actuation. This small force is substantially constant, and does not increase with higher temperature, as with the conventional type of strain release.

In the limit switch actuating mechanism of Figure 2, the switch 21 is of the type in which a greater force is required to move the member 20 in (to the left in the drawings) to its actuated (switch open) position, than is required to hold it there. The force due to the internal spring in this switch therefore always acts in a direction so as to move link 16 to the left. When the switch is opened, through the movement of arm 12 to the right, this force decreases suddenly. Further movement of the arm 12 in a counterclockwise direction will make no substantial change in the position of the link 16 and hence the force opposing rotation of the thermostatic element will remain substantially constant. This mechanism acts as a strain release, therefore, as effectively as the snap action mechanism of Figure 3.

The spring 15 and the link 22 may be interchanged in position, without affecting the operation of my device, or if desired, two springs may be used instead of a spring and a link. The same changes may be made in spring 31 and link 37.

Safety standards have been set up for furnaces utilizing control instruments of this type, which require that the maximum delivered air temperature at which the limit switch may be manually set to cut off, be not greater than 250° F. These standards also require that the highest temperature at which the fan switch may be manually set to turn on the fan be not greater than 200° F. The slot 27 is provided with shoulders as at 47, which prevent the setting of the indicators 25, 42, and 43, above these prescribed limits.

When these devices are manufactured, the secondary adjusting plate 54 is set so that the head of screw 56 is opposite the zero mark on the scale. The device is then calibrated by loosening the screw 53 and moving the plate 51 until the scale on the cover 19 accurately reflects the temperatures at the thermostatic element which will cause operation of the switches. The device meets the prescribed safety standards, insofar as temperatures at the thermostatic element are concerned.

When installed in a furnace, however, the thermostatic element may be exposed to radiant heat from the heat exchanger so that its temperature is actually higher than that of the air in the furnace bonnet. This will cause the maximum cut-off point of the limit switch to occur when the delivered air temperature is lower than 250° F. and the usefulness of the device will be impaired. Other conditions besides radiation may cause inaccurate operation of the device. Among such conditions are extremely low air velocities and rapid rates of temperature change at the element. For instance, very low air velocity may result in the establishment of a considerable temperature gradient between the point where the thermostat is mounted and the point of air delivery. On the other hand high rates of temperature change may cause a considerable lag in the response of the thermostatic element.

In order to overcome these difficulties, the secondary adjusting plate 54 is provided. The safety standards body which established the safety limits set forth above has determined, for each type of furnace, a setting of this secondary adjustment plate which will compensate for all these conditions, and make the instrument accurately reflective of the temperature conditions at the point of delivery of air from the furnace. Each furnace manufacturer to whom these devices are supplied is furnished with special wrenches to fit the head of the screw 56 in each device. After the prescribed adjustment of the switch for each furnace is made by its manufacturer, it may not then be tampered with by unauthorized persons so as to permit dangerous conditions to occur.

While I have shown and described a particular embodiment of my invention it should be understood that its scope is to be limited only by the appended claims.

I claim as my invention:

1. In combination, a member movable in accordance with the variations of a variable condition, a switch operable by said member, a strain release spring, and means including said spring operatively connecting said member with said switch so that the tension of said spring, and thereby the force opposing movement of said member in either direction remains substantially constant after actuation of said switch in a corresponding direction.

2. In combination, a member rotatable about an axis in accordance with the variations of a variable condition, a switch operable between open and closed positions, a frame for supporting said member and said switch, a first link pivoted at one end to said member at a point displaced from the axis thereof, a second link connected at one end to said frame, at least one of said links comprising a spring, and a third link operatively connected at one end to said switch, said links being connected to each other at their opposite ends and so proportioned that their joined ends lie substantially in line with the axis of rotation of said member.

3. In combination, a member rotatable about an axis in accordance with the variations of a variable condition, a switch operable between open and closed positions, a frame for supporting said member and said switch, a first link pivoted at one end to said member at a point displaced from the axis thereof, an arm movably mounted on said frame, a second link pivoted at one end to said arm, at least one of said links comprising a spring, and a third link operatively connected to said switch, said links being joined to each other at their opposite ends, and so proportioned that their joined ends lie substantially in line with the axis of rotation of said member.

4. In combination, a member rotatable about an axis in accordance with the variations of a variable condition, a switch operable between open and closed positions, a frame for supporting said member and said switch, a first link pivoted at one end to said member at a point displaced from the axis thereof, an arm adjustably mounted on said frame and having indicator means thereon, a scale on said frame for cooperation with said indicator to show the magnitude of said variable condition at which said switch is actuated, a second link pivoted at one end to said arm, at least one of said links comprising a spring, and a third link operatively connected to said switch, said links being joined to each other at their opposite ends, and so proportioned that their joined ends lie substantially in line with the axis of rotation of said member.

5. In combination, a member rotatable about an axis in accordance with the variations of a variable condition, a switch operable between open and closed positions, a frame for supporting said member and said switch, a first link pivoted at one end to said member at a point displaced from the axis thereof, an arm pivotally mounted at one end thereof in line with the axis of rotation of said member for rotation about said axis, a pair of adjustable stop members for limiting the rotation of said arm in either direction, a second link pivoted to the free end of said arm, at least one of said links comprising a spring, and a third link operatively connected to said switch, said links being joined to each other at their opposite ends, and so proportioned that their joined ends lie substantially in line with the axis of rotation of said member.

6. In combination, a member rotatable about an axis in accordance with the variations of a variable condition, a plurality of switches operable in sequence upon movement of said member, a casing for supporting said member and said switches, means operatively connecting said member with each of said switches, said means comprising, for each switch, a first link pivoted at one end to said member at a point spaced from the axis thereof, a second link, a connection between one end of said second link and said casing, at least one of said links comprising a spring, and a third link operatively connected to said switch, said links being connected to each other at their opposite ends and so proportioned that their joined ends lie substantially in line with the axis of rotation of said member, each said connection for certain of said switches comprising an arm pivotally mounted at one end thereof in line with the axis of rotation of said member and adapted to pivotally support said second link at its other end, and a pair of adjustable stops for limiting the rotation of said arm in either direction.

7. In combination, a member rotatable about an axis in accordance with the variations of a variable condition, a switch operable between open and closed positions, a frame for supporting said member and said switch, a first link pivoted at one end to said member at a point displaced from the axis thereof, an arm pivotally mounted at one end thereof in line with the axis of rotation of said memer for rotation about said axis, a pair of adjustable stop members for limiting the rotation of said arm in either direction, said stop members being separately adjustably mounted on said frame for rotation about a point in line with the axis of rotation of said member and having indicator means thereon, a scale on said frame for cooperation with said indicator means to show the adjustment of said stops, a second link pivoted to the free end of said arm, at least one of said links comprising a spring, and third link operatively connected to said switch, said links being joined to each other at their opposite ends, and so proportioned that their joined ends lie substantially in line with the axis of rotation of said member.

8. In combination, a member rotatable about an axis in accordance with the variations of a variable condition, a plurality of switches operable in sequence upon movement of said member, a casing for supporting said member and said switches, means operatively connecting said member with each of said switches, said means comprising, for each switch, a first link pivoted at one end to said member at a point spaced from the axis thereof, a second link, a connection between one end of said second link and said casing, at least one of said links comprising a spring, and a third link operatively connected to said switch, said links being connected to each other at their opposite ends and so proportioned that their joined ends lie substantially in line with the axis of rotation of said member, each said connection for certain of said switches comprising an arm pivotally mounted at one end thereof in line with the axis of rotation of said member and adapted to pivotally support said second link at its other end, a pair of adjustable stops for limiting the rotation of said arm in either direction, said stop members being separately adjustably mounted on said casing for rotation about a point in line with the axis of rotation of said member and having indicator means thereon, each said connection for others of said switches comprising an arm adjustably mounted on said casing for rotation concentrically with said stop members, said arm having indicator means thereon and being adapted to pivotally support said second link, an arcuate slot in said casing, a scale on said casing adjacent said slot, said indicators projecting through said slot to permit manual adjustment thereof and cooperating with said scale to indicate the the magnitude of said variable condition at which each switch is actuated.

9. In combination, a member rotatable about an axis in accordance with the variations of a variable condition, a switch of the type which must be positively moved to each operative position, a frame for supporting said member and said switch, a first link pivoted at one end to said member at a point spaced from the axis thereof, a second link, a connection between one end of said second link and said frame, at least one of said links comprising a spring, and a third link operatively connected to said switch, said links being connected to each other at their opposite ends and so proportioned that their joined ends lie substantially in line with the axis of rotation of said member.

10. In combination, a member rotatable about an axis in accordance with the variations of a variable condition, a switch of the type which must be positively moved to each operative position, a frame for supporting said member and said switch, a first link pivoted at one end to said member at a point spaced from the axis thereof, a second link, a connection between one end of said second link and said frame, at least one of said links comprising a spring, a third link operatively connected to said switch, said links being connected to each other at their opposite ends and so proportioned that their joined ends lie substantially in line with the axis of rotation of said member, said connection comprising an arm pivotally mounted at one end thereof in line with the axis of rotation of said member, and adapted to pivotally support said second link at its other end, and a pair of adjustable stops for limiting the rotation of said arm in either direction.

11. In combination, a first member movable in accordance with a variable condition, a plurality of switches operable in sequence upon movement of said first member, a casing for supporting said first member and said switches, and means adjustably connecting said first member with each of said switches, each said means including a strain-release mechanism and a second member independently mounted on said casing and movable relative thereto to change the magnitude of said condition at which each switch is operated.

12. In combination, a member movable in accordance with a variable condition, a plurality of switches operable in sequence upon movement of said member, a casing for supporting said member and said switches, said casing having a slot and a scale adjacent said slot, and means adjustably connecting said member with each of said switches, each said means including a strain-release mechanism and indicator mounted on said casing and extending through said slot, each said indicator being movable along said slot to change the magnitude of said condition at which its related switch is operated and cooperating with said scale to indicate said magnitude.

13. In combination, a member rotatable about an axis in accordance with the variations of a variable condition, a pair of switches operable in sequence upon movement of said member, actuating means for each switch, and means operatively connecting said member with each of said actuating means, said connecting means comprising a pair of springs with one end of each spring attached at substantially diametrically opposite points to said member, and the other end of each spring attached at a point substantially in line with said axis to one of said actuating means.

14. In a thermostatically operated switch adapted to be mounted in the bonnet of a warm air furnace, in combination, a casing for said switch, a thermostatic element mounted on said casing so as to project within said bonnet, a member connected at one end to said element and at its other end to said switch, and means for connecting the other end of said element to said casing, comprising a first plate rigidly connected to said other end of the element, a second plate mounted on said casing, means for adjusting said first plate relative to said second plate, and means for adjusting said second plate relative to said casing.

15. A switch adapted to be mounted in the bonnet of a warm air furnace and to be operated in accordance with the temperature of the air delivered from said furnace, including in combination, a casing for said switch, a thermostatic element mounted on said casing so as to project within said bonnet, means adjustably connecting said element with said switch including a member mounted on said casing and movable relative thereto to change the temperature at which said switch is operated and a scale cooperating with said member to indicate said temperature, means for calibrating said element so as to make said scale accurately reflective of the temperature at the element, and means for compensating the action of said element so as to make said scale accurately reflective of the air temperature at the point of delivery from the furnace.

16. In combination, a member rotatable about an axis in accordance with a variable condition, a switch, a first transmitting member movable by said rotatable member, a second transmitting member operatively connected to said switch, said transmitting members being attached to each other at a point substantially in line with said axis.

17. A condition responsive control device, comprising in combination, an element movable in response to a variable condition, a switch biased to a first position and having a fixed differential between a first operating force needed to move it from said first position to a second position, and a second operating force required to hold it in said second position, and means operatively connecting said element and said switch including a device for independently varying the value of said condition at which each of said two forces is transmitted to said switch, and a strain release device whereby overrun of said element after actuation of said switch in either direction is prevented from imposing undue strains on the mechanism.

18. In combination, a member rotatable about an axis in accordance with a variable condition, a switch operable by said member, a strain release spring, and means including said spring operatively connecting said member with said switch and said spring operatively connected to said switch at a point substantially in line with said axis so that the tension of said spring, and thereby the force opposing movement of said member in either direction remains substantially constant after actuation of said switch in a corresponding direction.

19. In combination, a member movable in accordance with a variable condition, a plurality of switches operable in sequence upon movement of said member, a casing for supporting said member and said switches, and means adjustably connecting said member with each of said switches, each said means including a strain release mechanism, an adjustment member mounted on said casing, a switch actuating link connected to said strain release mechanism, and a pivotal support for said link, said pivotal support movable by said adjustment member relative to said strain release mechanism to change the magnitude of said condition at which each switch is operated.

20. In combination, a member movable in accordance with a variable condition, a plurality of switches, means adjustably connecting said member with each of said switches, each said means including a strain release mechanism, a switch actuating link, a support for said link, a pivot for said support and said pivot movable relative to said strain release mechanism for adjusting the magnitude of said condition at which each switch is operated.

21. In combination, a first member movable in accordance with a variable condition, control means, means adjustably connecting said first member with said control means, said adjustable connecting means including a strain release mechanism, a second member for operating said control means, and an adjustable support for said second member movable relative to said strain release mechanism for adjusting the magnitude of said condition at which said control means is operated.

STEPHEN CRUM.